(12) United States Patent
Correa et al.

(10) Patent No.: US 6,782,801 B1
(45) Date of Patent: Aug. 31, 2004

(54) STOVE TOP BARBECUE

(76) Inventors: Jose Correa, 4747 State St. #D, Ontario, CA (US) 91762; Reynolds K. Ohai, 18450 Monte Vista, Chino, CA (US) 91710

( * ) Notice: Subject to any disclaimer, the term of this patent is extended or adjusted under 35 U.S.C. 154(b) by 0 days.

(21) Appl. No.: 10/703,673

(22) Filed: Nov. 10, 2003

(51) Int. Cl.[7] .......................... A47J 27/00; A47J 27/58; A47J 37/00; A47J 37/06; A47J 37/10
(52) U.S. Cl. .................. 99/340; 99/400; 99/425; 99/444; 99/446; 99/447; 99/450; 99/482
(58) Field of Search ...................... 99/339, 340, 400, 99/401, 422–425, 444–450, 481, 482; 126/373.1, 369, 215, 214 C, 25 R, 41 R, 9 R; D7/408

(56) References Cited

U.S. PATENT DOCUMENTS

| 862,719 | A | * | 8/1907 | Davis | 126/215 |
|---|---|---|---|---|---|
| 1,642,071 | A | * | 9/1927 | Hosking | 99/446 |
| 3,871,356 | A | * | 3/1975 | Saponara | 126/215 |
| 4,508,024 | A | * | 4/1985 | Perkins | 99/340 |
| 4,509,412 | A | * | 4/1985 | Whittenburg et al. | 99/331 |
| 5,511,466 | A | * | 4/1996 | Dzibinski | 99/339 |
| 5,682,811 | A | | 11/1997 | Kidushim | |
| 5,983,882 | A | * | 11/1999 | Ceravolo | 126/25 R |
| 5,988,045 | A | * | 11/1999 | Housley | 99/339 |
| 6,105,487 | A | * | 8/2000 | Nash et al. | 99/400 |
| 6,213,006 | B1 | * | 4/2001 | Reardon et al. | 99/446 |
| 6,263,784 | B1 | | 7/2001 | Wodeslavsky | |
| 6,389,961 | B1 | | 5/2002 | Wu | |
| 6,523,460 | B1 | * | 2/2003 | Lange | 99/340 |
| 6,526,875 | B1 | * | 3/2003 | Dzbinski | 99/339 |
| 6,575,082 | B1 | * | 6/2003 | Liao | 99/340 |

* cited by examiner

Primary Examiner—Timothy F. Simone
(74) Attorney, Agent, or Firm—Edgar W. Averill, Jr.

(57) ABSTRACT

A stove top barbecue assembly for placement over a flame of a gas stove. The assembly has a base ring which has a center opening which is at least as large as the flame of the gas stove. A cage, which is made from a metal with openings, contains cinders which are heated by the gas flame. A grill is supported by the base ring over the cage and includes channels to guide any grease to the outer periphery of the base ring.

8 Claims, 5 Drawing Sheets

STOVE TOP BARBECUE

BACKGROUND OF THE INVENTION

The field of the invention is barbecues and the invention relates more particularly to small portable barbecues.

Conventional barbecues, no matter how small or portable, are designed for use out of doors. Many times the climate out of doors is not conducive to barbecuing. It would thus be advantageous to have a barbecue which could be used indoors.

BRIEF SUMMARY OF THE INVENTION

The present invention is for a stove top barbecue assembly for placement over a flame of a gas stove. The assembly has a base ring with a center opening which is at least as large as the outer periphery of the flame. The center opening is surrounded by an upwardly extending grease retaining ring, which extends upwardly from a floor. The floor extends to an upwardly and outwardly extending sidewall. The sidewall terminates in an open top. The base ring is supportable over the flame of the stove. A cage having a bottom, sidewalls, and a top is fabricated from a metal with openings and has an enclosed interior volume. The enclosed interior volume is filled with cinders. The cage rests on the upwardly and outwardly extending sidewall of the base ring. A grill is supported near the top of the base ring and preferably has a plurality of upwardly oriented channels for guiding the flow of grease to an outward peripheral channel. Preferably, the outward peripheral channel includes a downwardly depending grease guide having an outlet therein. The base ring preferably has a mating opening which permits the passage of the downwardly depending grease guide. A grease cup is preferably set under the outlet of the downwardly depending grease guide.

DETAILED DESCRIPTION OF THE INVENTION

Figure 1:
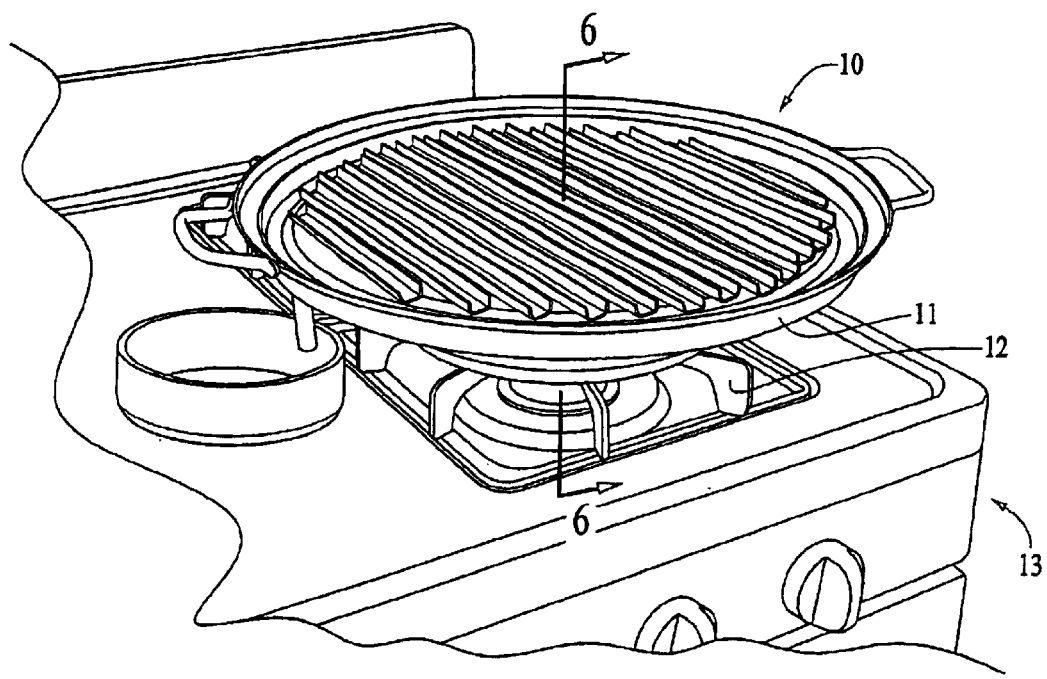
FIG. 1 is a perspective view of the stove top barbecue assembly of the present invention placed over the burner of a gas stove.

A stove top barbecue assembly is shown in perspective view in FIG. 1 and indicated generally by reference character 10. Assembly 10 includes a base ring 11 which rests on pan support 12 of gas stove 13.

Figure 2:
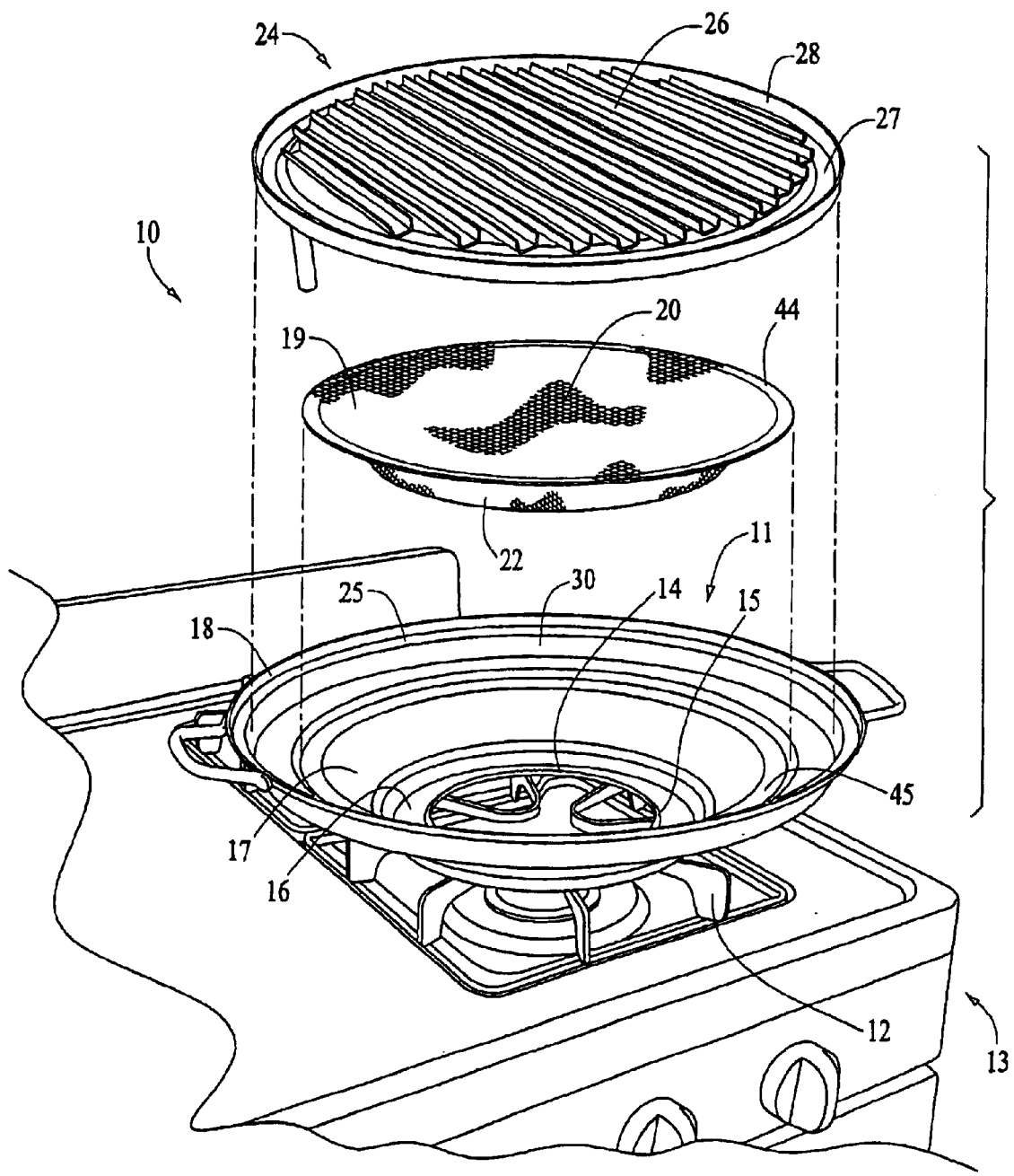
FIG. 2 is an exploded perspective view thereof.

The assembly of FIG. 1 is shown in exploded perspective view in FIG. 2. There it can be seen that base ring 11 has a center opening 14. Center opening 14 is surrounded by an inner upwardly extending grease retaining ring 15. Ring 15 extends downwardly to a floor 16. An upwardly and outwardly extending sidewall 17 extends from floor 15. Sidewall 17 has several flanges which will be described in further detail below for supporting other portions of the assembly. Base ring 11 has an open top 18.

Sidewall 17 supports a cage 19 which is made with a metal with openings, such as a mesh or a perforated metal. The cage 19 has a top 20, a bottom 21 shown in FIG. 5, and sidewalls 22. The cage 19 has a closed interior volume 49 which encloses cinders 23. The term "cinders" is intended to include any material which can be heated by a flame to a glowing temperature without destruction. Numerous ceramic materials have been developed for this use and such ceramic pieces are indicated by reference character 23' in FIG. 6. The presence of cinders helps to ensure that all the natural gas is completely burned.

Because cage 19 is completely enclosed, it is possible that the cage may be placed in a dishwasher after the barbecue has been used and run through a normal dishwashing cycle to remove any grease or other materials on the outer periphery of the cage.

A grill 24 rests on a flange 25 of sidewall 17. Grill 24 has a plurality of cross, upwardly oriented channels 26. These channels 26 are preferably slightly domed from one end to the other end so that grease is guided to a grease retaining ring 27 which is surrounded by an upwardly extending upper wall 28.

Figure 5:
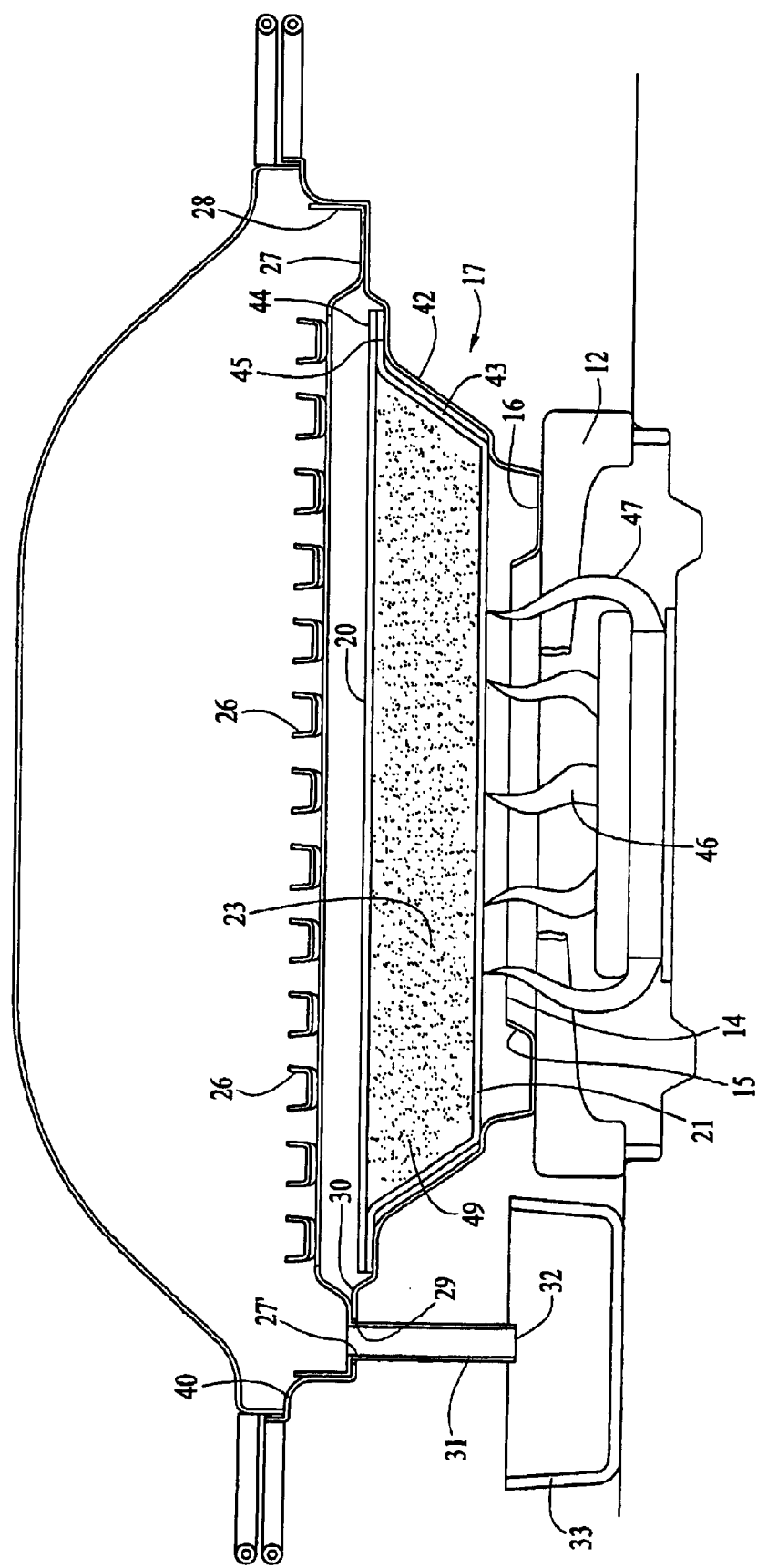
FIG. 5 is a cross-sectional view of the assembly taken along line 5—5 of FIG. 3.

Grease retaining ring 27 may have an opening 27' shown in FIG. 5. This passes through an opening 29 in the grill support floor 30 of sidewall 27. A downwardly depending grease guide 31 has a grease outlet 32. A cup 33 is placed under outlet 32 for the collection of grease passing through channels 26 into grease retaining ring 27.

Figure 3:
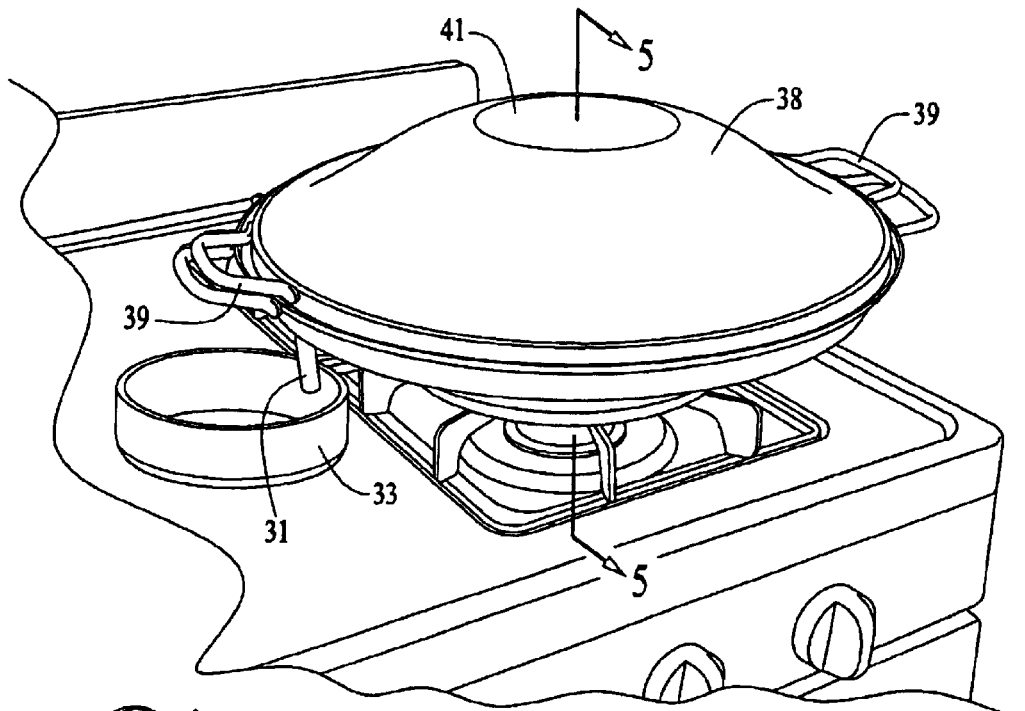
FIG. 3 is a view of the assembly of FIG. 1 further including a cover.
Figure 4:
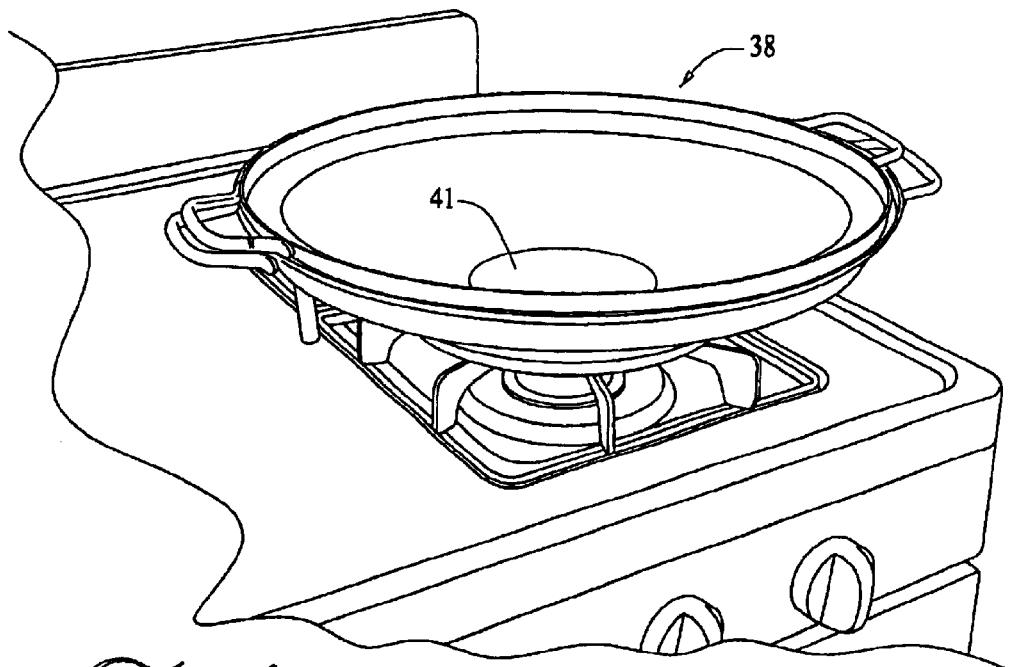
FIG. 4 is a perspective view of the barbecue of FIG. 1 including an inverted cover functioning as a wok.

The assembly of FIG. 3 further includes a cover 38 with a pair of handles 39. The cover rests in a cover flange 40 shown in FIG. 5. This is used when it is desired to retain moisture of the food being grilled. As shown in FIG. 4, cover 38, which has a flat floor 41, may be inverted, the cage 19 removed, and the assembly can be used as a wok for stir frying food.

Figure 6:
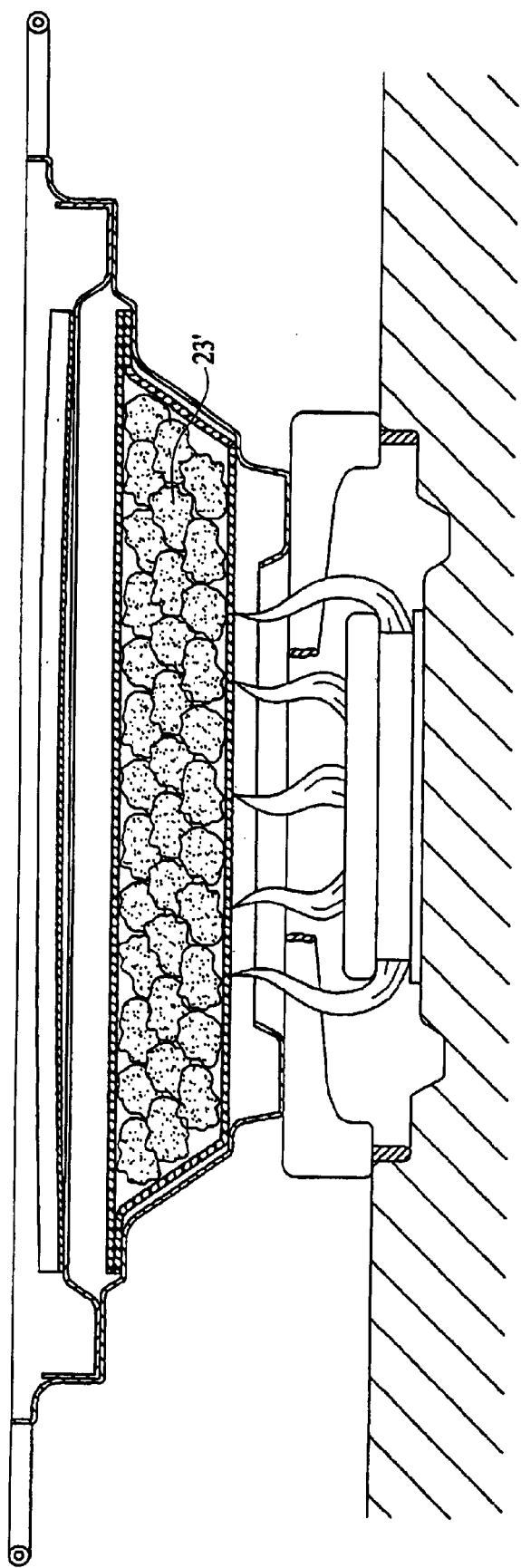
FIG. 6 is a cross-sectional view of the assembly taken along line 6—6 of FIG. 1.

As shown in FIGS. 5 and 6, the upwardly and outwardly extending sidewall 17 includes a frusto conical portion 42. Frusto conical portion 42 supports a frusto conical portion 43 of cage 19. As can also best be seen in FIGS. 5 and 6, cage 19 has an outwardly extending circular flange 44 which rests on a cage floor 45 of the upwardly and outwardly extending sidewall 17.

As shown in FIG. 5, the flame 46 has an outer periphery 47 which fits within central opening 14. Thus, all of the flame's heat passes into the closed interior volume 49 of cage 19 and heats the cinders 23 to a glowing red temperature. Meat or other foodstuffs placed on the upper surface of grill 25 can form grease or other drippings, some of which is caught in channels 26 and eventually lead to cup 23. For that portion of any grease which happen to pass through the closed interior volume 49 or along the interior surface of sidewall 17, it will be retained behind the inwardly upwardly extending grease retaining ring 15. This is a very small amount of material typically, hence the vast majority of it will be burned by the heated cinders 23. In the event the grill of FIG. 7 is used, essentially no grease or drippings will pass onto floor 16. The result is a safe, easy-to-use barbecue which may be quickly set up on the top of a stove. It is also very easy to clean since cage 19 as well as the other parts may be washed in a dishwasher. The various parts of the grill are preferably fabricated from stainless steel.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A stove top barbecue assembly for placement over a flame of a gas stove, said flame having an outer periphery, said assembly comprising:

a base ring having a center opening at least as large as said outer periphery, said center opening surrounded by an inner, upwardly extending grease retaining ring which extends downwardly to a floor which extends outwardly to an upwardly and outwardly extending side wall which terminates in an open top, said base ring being supportable over the flame;

a cage having a bottom, sidewalls and a top, said cage being fabricated from a metal with openings and said cage having an enclosed interior volume filled with cinders and said cage having a circular outer periphery which rests on said upwardly and outwardly extending sidewall; and a grill which has an outer edge which rests on said upwardly and outwardly extending sidewall adjacent said open top.

2. The stove top barbecue assembly of claim 1 wherein said grill includes a plurality of cross, upwardly oriented channels for guiding the flow of grease to an outer peripheral channel.

3. The stove top barbecue assembly of claim 2 wherein said plurality of channels are domed so that grease flows into said outer peripheral channel.

4. The stove top barbecue assembly of claim 2 wherein said outer peripheral channel has at least one exit opening in a bottom floor thereof and said exit channel has a downwardly depending grease guide and said assembly includes a grease collecting cup below a bottom end of said grease guide and said upwardly and outwardly extending sidewall includes a grill floor including an opening for the passage of said downwardly depending grease guide.

5. The stove top barbecue assembly of claim 1 wherein said cage has an outwardly extending circular flange and said upwardly and outwardly extending sidewall includes a cage flange rest floor formed to hold said cage within the wall of said base ring.

6. The stove top barbecue assembly of claim 5 wherein said cage is fabricated from a wire mesh.

7. The stove top barbecue assembly of claim 1 wherein said base ring includes a cover supporting ring and said assembly further includes a cover.

8. The stove top barbecue assembly of claim 1 wherein the sidewalls of said cage are frusto conical and the upwardly and outwardly extending sidewall of said base ring includes a frusto conical cage resting ring portion upon which said cage rests.

\* \* \* \* \*